April 27, 1965 K. C. ALLEN Re. 25,768

COMPUTING SCALE

Original Filed July 23, 1952 3 Sheets-Sheet 1

INVENTOR.
KENNETH C. ALLEN
BY
Marechal Biebel French & Bugg
ATTORNEYS

COMPUTING SCALE

Original Filed July 23, 1952 3 Sheets-Sheet 2

INVENTOR.
KENNETH C. ALLEN
BY
Marechal Biebel French & Bugg
ATTORNEYS

COMPUTING SCALE

Original Filed July 23, 1952 3 Sheets-Sheet 3

INVENTOR.
KENNETH C. ALLEN
BY
Marechal, Biebel, French & Bugg
ATTORNEYS

United States Patent Office

Re. 25,768

Reissued Apr. 27, 1965

25,768

COMPUTING SCALE

Kenneth C. Allen, Dayton, Ohio, assignor to The Hobart Manufacturing Company, Troy, Ohio, a corporation of Ohio Original No. 3,044,691, dated July 17, 1962, Ser. No. 38,656, June 24, 1960, which is a continuation of Ser. No. 300,445, July 23, 1952. Application for reissue Nov. 7, 1962, Ser. No. 236,772

21 Claims. (Cl. 235—58)

Matter enclosed in heavy brackets [ ] appears in the original patent but forms no part of this reissue specification; matter printed in italics indicates the additions made by reissue.

This invention relates to scale mechanism and more particularly to a computing scale which produces either a visual or printed record of the weight, unit price, and value of the article being weighed.

It is a principal object of the invention to provide a computing scale mechanism incorporating a chart having a pattern of lines thereon in predetermined decade arrangement such that the number of lines encountered in traversing the chart in the several decade positions is indicative of the weight of the article.

It is a further object to provide such a scale in which scanning or sensing means is arranged to traverse the chart after the scale comes to a rest following a weighing operation and to set the count as determined from said chart and as indicative of the weight of the article, into a computer by means of which the actual value of the article weighed can be determined.

It is also an object to provide such a scale in which the price per pound of the article is set independently into the computer device and in which either a visual indication is provided, or the computer arranged to actuate a printer to print a ticket, or both.

It is a further object to provide a scale of this character in which the scanning and computing cannot take place until after the scale has come to a position of rest.

It is a further object to provide such a scale in which if the scale comes to rest at other than a whole graduation position it is slightly displaced to bring it to such whole position, thus avoiding errors in reading and assuring accuracy of the ultimate result.

It is a still further object to provide a scale which is simple in construction, accurate and reliable in operation, and which provides the desired indication of the weight and value of the article being weighed rapidly and as fast as the information can be utilized for all ordinary purposes.

Other objects and advantages will be apparent from the following description, the accompanying drawings, and the appended claims.

In the drawings—

Figure 1:
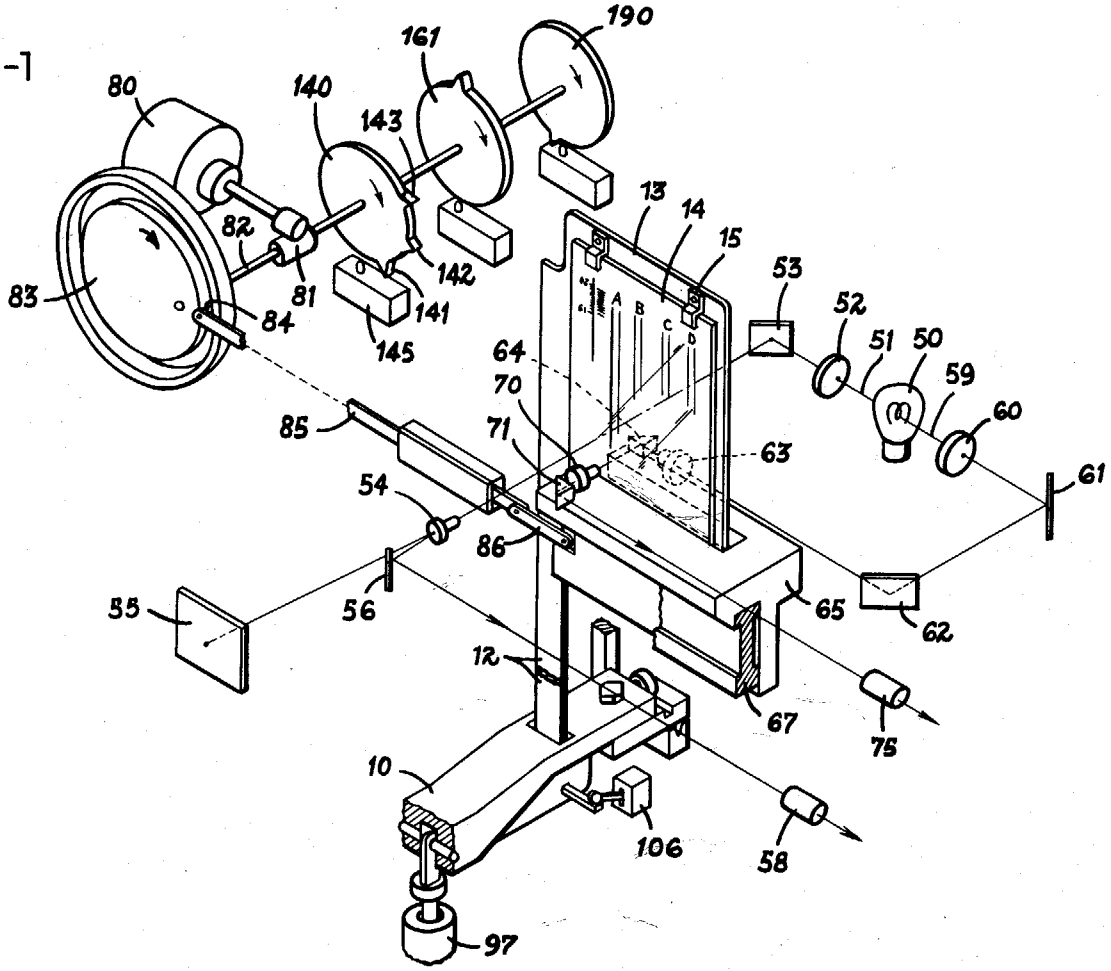
FIG. 1 is a diagrammatic view in perspective showing the essential elements in the scale of the present invention.

Referring to the drawing which discloses a preferred embodiment of the invention, the scale has a weighing mechanism of any suitable type, only the lever 10 forming a part thereof being shown. It will be understood, however, that it can function with pendulum weights, springs or in any other suitable manner.

Attached to the lever 10 and arranged for vertical translational movement therewith is an arm 12 carrying a frame 13 within which there is received the chart 14 held thereto by suitable brackets 15. The chart is shown in further detail in FIGS. 2 and 3 and comprises a glass plate having adjacent one side a series of weight graduations indicated at 20. Since the chart moves downwardly in response to the application of weight to the scale, and further since the scale utilizes optical means for producing an image, the designations 20 are preferably inverted so that they increase upwardly. As shown, this scale is graduated in hundredths of pounds.

Adjacent the scale 20 is a pattern of lines 25 which are uniformly spaced and relatively short in length, this pattern extending over the entire length of the plate. Such pattern is utilized for preventing the scanning of the remainder of the chart until the scale has come to rest, and likewise for justification purposes, as will be described more fully below. While any convenient arrangement may be used, it is desirable and convenient to so arrange the lines 25 that there are 100 to the pound. The lines are considered to be opaque with the spaces therebetween translucent.

The remainder and major portion of the chart is formed with a second pattern of lines indicated at 30. These lines are arranged in four groups or decades, corresponding to the desired reading of the weight as it would customarily appear in numerical notation, that is, in tens, units, tenths and hundredths of pounds respectively.

Figure 2:
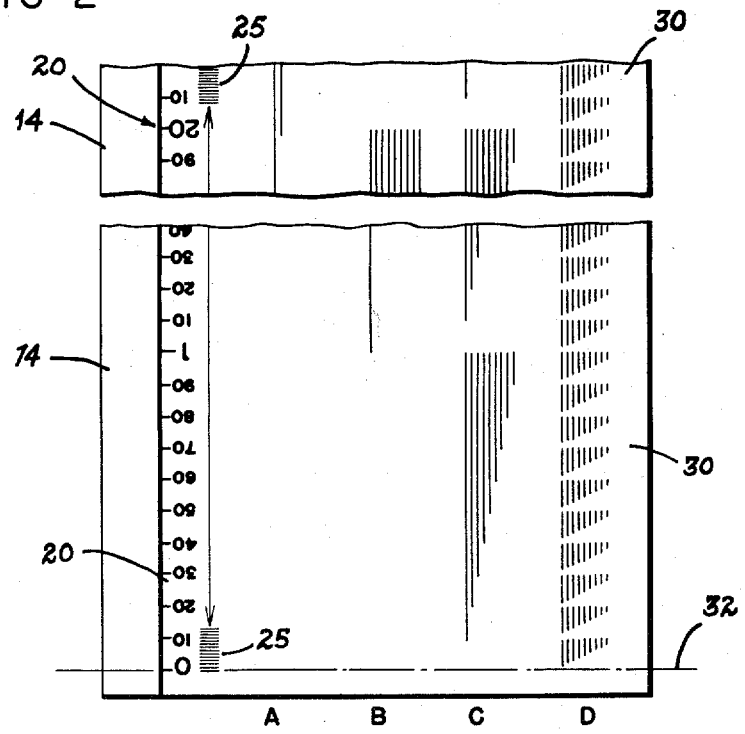
FIG. 2 is a broken view showing the arrangement of the chart.

Referring to FIG. 2, these several columns are indicated by letters A, B, C and D. Starting with the zero position of the scale it will be seen that if the portion 30 of the scale were traversed from one side to the other in this position none of the lines of this pattern would be crossed or intersected. However, if weight is applied to the scale, it will move downwardly relative to the zero or datum line position indicated at 32 and if it is then traversed, a definite number of lines will be crossed or counted. If for example the weight is 0.05 pound, the chart will be lowered to such a point that the first five lines in the D column will be intercepted at the datum line position. Hence a count of five would occur in the D position, representative of the 0.05 of a pound.

With a further weight such as 0.15 of a pound, the chart will be lowered further to such a point that in traversing the same, one line in the C column and five lines in the D column will be traversed or counted. Thus a count of 0.15 pound is shown.

Similarly, and without further detailed analysis, it will be apparent that when the weight exceeds a full pound, one or more lines in the B position will be counted, and when the weight exceeds 10 pounds, one or more lines in the A position will be counted. In each case the count will correspond to the predetermined number of lines in each of the four digital or decade positions, representative of the actual weight on the scale.

Figure 3:
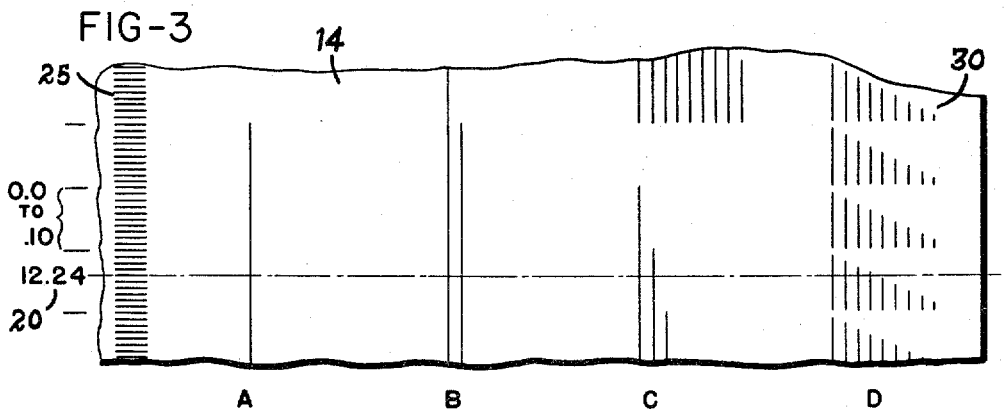
FIG. 3 is a further view of the chart on a larger scale illustrating a typical weight indicating position thereof.

FIG. 3 shows a typical illustration representative of a weight of 12.24 pounds. There is one line to be counted in the A position, two in the B position, two in the C position and four in the D position.

Referring now to the diagrammatic representation in FIG. 1, a light source 50 forms a beam 51 which is passed through condenser lens 52, and is reflected by mirror 53 on to the weight reading column 20 of the chart. By means of lens 54 a weight column image is projected on to a ground glass or other suitable screen 55, forming a visible and readable indication of the weight of the article.

Another portion of the same beam 51 passes through the pattern of lines 25 and is reflected by mirror 56 into a light sensitive device such as photocell 58 which is so masked as to respond to only one line or space at a time. It will be understood that this particular part of the beam will vary off and on as the pattern of lines 25 moves with the chart, and will stabilize to a stationary condition only when the chart has come to a position of rest.

Another light beam 59 from source 50 passes through lens 60, mirrors 61 and 62, lens 63 and right angle prism 64 for the purpose of illuminating the decade portion 30 of the chart. Lens 63 and prism 64 are mounted on a frame or carriage 65 which is guided on support 67 to provide for transverse movement of the illumination from one side of the pattern 30 on the chart to the other.

On the opposite side of the chart a lens 70 picks up the lighted portion of the chart and projects it through right angle prism 71 by means of which the image is reflected into a sensing or counting photocell indicated at 75. Lens 70 and prism 71 are likewise mounted on [a] *and* movable with frame 65.

The carriage 65 is arranged to be gradually and smoothly reciprocated to perform its traversing movement by means of a drive motor 80 coupled through suitable gearing 81 to shaft 82 on which there is mounted an eccentric 83 having a follower 84 connected by arm 85 to a link 86 pivotally attached to the carriage. In this way rotation of the motor will cause a cycle of traversing movement of the carriage beginning at one column, column A, and proceeding uniformly to column D, followed by a return movement to its initial position.

Figure 4:
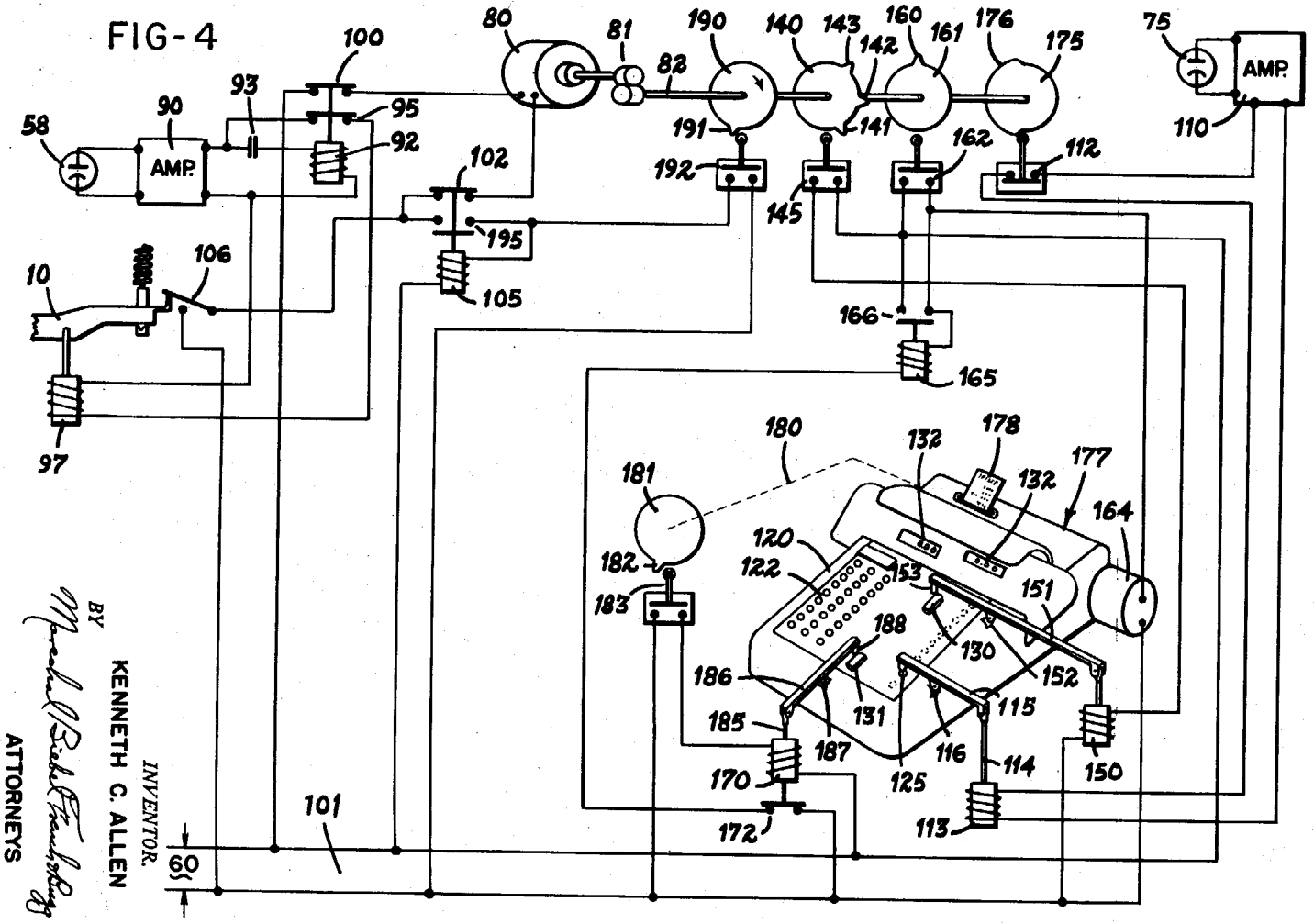
FIG. 4 is a diagrammatic layout of the electrical circuits incorporated in the device.

Referring now to the circuit diagram shown in FIG. 4, the photocell 58 is connected through amplifier 90 to a relay 92 with a condenser 93 in circuit therewith to provide for transmission of only an alternating current component. Thus it will be seen that during the time the chart is moving, a variation in the intensity of the light beam falling on photocell 58 occurs as each opaque line 25 and then a translucent space passes the datum line position. As a result of this an alternating current flows in the output circuit of the amplifier which energizes the coil of relay 92 thereby raising its armature and opening both circuits which it controls. However, when the scale has come to a position of rest the alternating current ends, and with the coil then deenergized, the relay armature will fall.

Upon such falling of the armature of relay 92 contacts 95 thereof are closed completing a circuit from the output of amplifier 90 to a justifier magnet 97 which is mounted in fixed relation on the base and which pulls down on lever 10 upon being energized. The purpose of this justifier magnet is to assure that the scale has stopped in a whole graduation position, and not at an intermediate position between two of its weight graduations 25.

If the scale has come to a rest position with one of the black lines 25 opposite the light beam, no light will be transmitted and hence photocell 58 will not be energized and there will be no current flow in the justifier magnet, this being a whole graduation position. If, however, the scale has stopped between two lines, light will be transmitted to the photocell and the amplifier will produce a direct current output which will flow in the justifier circuit. The justifier solenoid 97 is connected directly to the lever and is arranged when actuated to displace the lever by a small amount, corresponding to a fraction of the minimum weight designation. It will be readily apparent that as this deflection proceeds, the chart will also move, and as it moves it will approach the position where a black line reduces the intensity of the light beam, and in turn reduces the pull of the magnet until a balance occurs with the black line almost but not entirely cutting of the light on photocell 58, this being referred to as a whole graduation position. In operation, therefore, this action takes place almost instantaneously and the scale quickly balances and if necessary justifies to a whole graduation position. Since this cannot be more than a fraction of the minimum graduation, it can be compensated for by a displacement of the entire set of graduations for a half of the minimum cause an increase in the weight reading, by having the entire pattern of graduations displaced so as to be a half graduation on the short or light side, the net effect is to disregard the fraction if it is less than half the minimum graduation, or to add to it if it is more than half the minimum graduation. This results in either a positive or negative correction to the nearest whole graduation. The scale will therefore under all conditions read either with complete accuracy or with a discrepancy of no more than half of one graduation.

Meanwhile the closing of upper contacts 100 of relay 92 has completed an energizing circuit from the supply source 101 to the drive motor 80, that circuit being traced through the back contacts 102 of relay 105, which contacts are closed when the relay is deenergized, which it is at this time. The circuit continues through a switch 106 which opens only in the zero position of the scale, and hence is shown as directly associated with the lever 10, its purpose being to deenergize the motor circuit at all times when no weighing is being performed. Since a weight is assumed to have been placed on the scale, switch 106 will be closed and the motor energizing circuit thus completed.

The present invention is intended to scan or count the number of lines in each of the four decade positions and to supply such count to a computing or calculating machine in proper sequence and with the proper shifting from one decade position to another. The machine has separate keys by means of which counts are received and the shift made from one decade to another. It also has a bank of keys through which the price per pound may be set in, and preferably has a portion providing a visual reading of the various factors. It is arranged to actuate a motor driven printer so that the weight, the unit price and the total price are all printed on a ticket in the course of a cycle of operation. Such a machine may take various forms, but for purposes of illustration, a suitable machine for this purpose is the Marchant rotary calculator such as shown in the patent to Avery 2,271,240 in which the "Non-Shift" key 1200 is permanently actuated and where the multiplier key is 2001, the column shift key is 1406, and the reset key is a combination of keys 373, 1910, and 122, the latter key being held in depressed position until the carriage returns to its initial position. Reference is likewise made to the construction shown in Dustin et al. 2,377,767 in which the reset key corresponds to that shown at 220. The present invention does not in fact require use of all of the facilities of such machine and only those elements embodied in the functioning of the present invention are here shown. A suitable commercially available machine of this type utilized by applicant is identified as the Marchant figure-MATIC calculator Model 8SD–X.

Motor 80 being now energized starts to rotate and as it does so, causes the rotation of cam 83 with the resultant traverse of the A position of the chart by the combined optical elements on carriage 65. As the light beam traverses the pattern of lines in the A position it will be actuated to count the number of lines which it intercepts, and this operation produces a corresponding number of flashes of light into photocell 75. This photocell is similarly connected to an amplifier 110, the output of which is sent through normally closed switch contacts 112 to cause the energization of a solenoid 113. Such solenoid has its armature 114 connected to a lever arm 115 pivoted at 116 at one side of the calculating or computing device indicated generally at 120.

Such device incorporates a bank of keys 122 which may be used to set into the computer the price per pound. With the three banks of keys shown, any price up to $9.99 per pound may be thus set. The computer also has a series of keys one of which is shown at 125 being a key which serves as a multiplier, only the key designated "1" being employed. The machine is set for that number can be thus set into the device for multiplication purposes. The other parts of the computer used in the present invention are the shift or decade selector key 130 and reset key 131. The computer embodies a display portion 132 upon which both factors and the product are visually shown.

From the above description it will be understood that as the light beam traverses the A potrion of the chart it will scan and respond to the number of lines which it crosses in that section of the chart, and the system will provide for actuation of lever 115 to same number of times, thereby depressing key 125 to cause repeat operations of the computing device in accordance with the digit representing the 10's of pounds. In the example shown in FIG. 3, this would involve one depression of key 125, representing one 10 pound factor. This operation takes place practically instantaneously and prior to the scanning of the next portion of the chart.

As rotation of motor 80 continues, it turns shaft 82 which carries thereon a cam 140 having three lobes 141, 142, and 143. Lobe 141 is so arranged that when the traverse of the A column is completed, it engages and trips a switch 145. This switch closes the circuit from the source 101 to a solenoid 150 the armature of which is connected to lever 151, similarly pivoted at 152 to the computing device and having a finger 153 adapted to depress the decade shift key 130. Hence when the scanning of the A portion of the chart has been completed, the mechanism shifts the computing device so that the count next received will actuate the computer for the units position. The rate of rotation of shaft 82 is relatively slow in comparison with the time required for the actuation of levers 115 and 151, so that each of these operations is completed before the scanning of the subsequent portion of the chart begins.

Further rotation of motor 80 then causes the light beam to traverse the B position of the chart. In doing so it picks up the count of the number of lines which it crosses, and in the same manner as before, causes the actuation of key 125 a corresponding number of times. In the example above described, the key would be actuated twice, corresponding to the two unit pounds, and with the decade position of the computer having been shifted, the cost of 12 pounds would now have been computed by the computing device.

Without further detailed analysis it will be readily understood that as the motor 80 continues, projection 142 will then shift the computer to the tenths of pounds positions in preparation of the scanning of the number of lines traversed in the C position of the chart, while projection 143 will perform a similar function for counting the hundredths of pounds in terms of the number of lines counted in the D position of the chart.

As the scanning motor 80 continues the rotation of shaft 82, a projection 160 on print cam 161 temporarily closes its contacts 162, thereby closing an energizing circuit to print motor 164 from supply source 101. Likewise, the closing of contacts 162 completes an energizing circuit from source 101 for the coil of a relay 165 which includes the normally closed contacts 172 of a relay 170. Relay 165 thereupon closes it contacts 166, locking itself in, and by-passing switch contacts 162. As an example of the combined operation of a multiplying unit and printer actuated by its own separate motor at the proper point in the cycle when the multiplying operation has been completed, reference is made to the patent to Clary et al. Re. 22,947. Although the present invention is not limited to this particular device, it illustrates apparatus suitable for the purpose in which the transfer assembly L is coupled to the product accumulator K to receive the product after the multiplying unit has been cleared and is then coupled with the racks B to print the product through the printer D. In this mechanism as shown in such patent, it is necessary to press motor bar 27 to actuate the accounting machine motor for printing and the closing of contacts 162 as described above is made to trip the motor circuit, thus initiating the printing cycle. The print motor thus starts and continues to run until the printing of the ticket has been completed.

During the second half of the revolution of cam shaft 82 the carriage 65 is being returned to it initial position and it is necessary to disconnect the counting amplifier 110 from its magnet 113, in that way preventing the counting of any of the lines on the chart during the reverse traverse of the scanning beam back to its original position. This is accomplished by means of a cam 175 on cam shaft 82 having a raised portion 176 occupying approximately half its periphery and which causes the opening of switch contacts 162 for the proper part of the cycle.

Meanwhile print motor 164 has caused the printer shown generally at 177 as directly associated with the computer 120 to produce a printed ticket 178 having thereon the proper identifying data such as the price per pound which has been set into the computer, the weight of the article in pounds and hundredths, and the value as computed by the computing device. This printing operation takes place relatively rapidly such that a cycle thereof is completed either before or shortly after the scanning motor 80 in the continuance of its operation has returned the scanning mechanism to its original position.

The output shaft of the printer is indicated at 180 to which there is secured a reset cam 181 having a single projection 182 thereon so related that it will engage switch arm 183 when the printer reaches the end of its cycle. Such operation momentarily closes an energizing circuit for relay 170, causing the breaking of the circuit through relay 165, which thereupon drops out, stopping the operation of the printing motor at the end of its cycle. The relay 170 likewise has an armature 185 to which is attached lever arm 186, pivoted at 187 to the computer with an actuating finger 188 arranged to depress the reset key 131. This causes the weight and value indicating dials to be reset to zero, and causes the return of the carriage to its original tens position, in preparation for another cycle of operation. The same operation may if desired also clear the unit price keyboard.

The scanning motor cam shaft 82 has another cam 190 thereon with a projection 191 so arranged that it will contact switch 192 upon the completion of the cycle of operation of the scanning motor, i.e., when the motor has returned the scanning member and carriage 65 to its initial position. Temporary closing of switch 192 causes the energization of relay 105 which thereupon opens its contacts 102, stopping the further operation of the scanning motor, thereby leaving the scanning system in condition for a subsequent operation with the carriage 65 in position to begin another traverse of the chart. At the same time, relay 105 closes another pair of contacts 195 which maintain the energizing circuit for the relay notwithstanding the opening of switch 192, this maintaining circuit being completed through the Open zero switch 106 which is still closed. Hence as long as the scale carries a weight, relay 105 will remain energized and prevent subsequent operation of the scanning system. When the article is removed from the scale and the lever returns to zero, switch 106 opens and thereby deenergizes relay 105. However, at this time the circuit to the scanning motor 80 is broken at switch 106 and hence the motor will not operate until following a subsequent weighing, and hence in the sequence already described in detail above.

The invention thus provides a simple and highly effective weighing and computing scale in which the values of weight are read by optical scanning means from a chart after the weighing has been completed and supplied to a computer into which has previously been set the other factor, namely, the price per pound. The computer provides an indication of the value, preferably shown visually and by means of a printed ticket, and such indication may likewise include the elements of unit price and weight. The device operates rapidly and accurately, and assures the provision of the indication without involving any possibility of error on the part of the operator due to reading a chart or other weight indication.

This application is a continuation of my copending application Serial No. 300,445, filed July 23, 1952 and now abandoned.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A computing scale mechanism for producing an indication of the computed value of an article being weighed comprising a chart movable in accordance with the weight of the article, means on said chart forming a pattern of lines of different length corresponding in number and decade arrangement to the weight of the article when scanned transversely, means for scanning transversely across the chart to produce a count corresponding to the number of lines in each such decade position, a computing device, means for operating said computing device a number of times corresponding to the count of the number of lines scanned in each of said decade positions as the factor indicative of the weight, means for setting into said computing device as a second factor the price per pound, and means controlled by said computing device for producing an indication of the product of said unit price and the weight of the article representing the computed value thereof.

2. A computing scale mechanism as defined in claim 1 including a printer, and means controlled by said computing device for printing a ticket on said printer indicating thereon the product of said unit price and the weight of the article representing the computed value thereof.

3. A computing scale mechanism for producing an indication of the computed value of an article being weighed comprising a chart movable in accordance with the weight of the article, means on said chart forming a pattern of lines of different length corresponding in number and decade arrangement to the weight of the article when scanned transversely, means for scanning transversely across the chart to produce a count corresponding to the number of lines in each such decade position, a computing device, means for operating said computing device a number of times corresponding to the count of the number of lines scanned in each of said decade positions as the factor indicative of the weight, means for changing the decade of the computer between successive operations in each of said decade positions, means for setting into said computing device as a second factor the price per pound, and means controlled by said computing device for producing an indication of the product of said unit price and the weight of the article representing the computed value of the article.

4. A computing scale mechanism as defined in claim 3 in which said scanning means operates optically to scan the number of lines during its transverse movement across the chart.

5. A computing scale mechanism for producing an indication of the computed value of an article being weighed comprising a chart movable in accordance with the weight of the article, means on said chart forming a pattern of lines of different length corresponding in number and decade arrangement to the weight of the article when scanned transversely, means for scanning transversely across the chart to produce a count corresponding to the number of lines in each such decade position, a computing device, means for operating said computing device a number of times corresponding to the count of the number of lines scanned in each of said decade positions as the factor indicative of the weight, means for changing the decade of the computer between successive operations in each of said decade positions, means for setting into said computing device as a second factor the price per pound, means controlled by said computing device for producing an indication of the computed value of the article, and means for resetting said computing device to zero position following completion of said scanning operation.

6. A computing scale mechanism for producing an indication of the computed value of an article being weighed comprising a chart movable in accordance with the weight of the article, means on said chart forming a pattern of lines of different length corresponding in number and decade arrangement to the weight of the article when scanned transversely, a single light sensitive means for scanning transversely across the chart to produce a count corresponding to the number of lines in each such decade position, means for determining when said chart has reached a stable position following the weighing operation, and means initiated by said stable determining means for activating said scanning means to traverse said chart only after said chart has come to rest.

7. A computing scale mechanism as defined in claim 6 in which said stable position determining means includes a pattern of lines of contrasting light characteristics on said chart, and optical means associated with said lines and sensitive to changes of light produced by movement of said lines.

8. A computing scale mechanism for producing an indication of the computed value of an article being weighed comprising a chart movable in accordance with the weight of the article, means on said chart forming a pattern of lines of different length corresponding in number and decade arrangement to the weight of the article when scanned transversely, means for scanning transversely across the chart to produce a count corresponding to the number of lines in each such decade position, means for determining when said chart has reached a stable position following the weighing operation, means initiated by said stable position determining means for activating said scanning means to traverse said chart only after said chart has come to rest, a computing device, means for operating said computing device a number of times corresponding to the count of the number of lines scanned in each of said decade positions as the factor indicative of the weight, means for setting into said computing device as a second factor the price per pound, and means controlled by said computing device for producing an indication of the product of said unit price and the weight of the article representing the computed value thereof.

9. A computing scale mechanism for producing an indication of the computed value of an article being weighed comprising a chart movable in accordance with the weight of the article, means on said chart forming a pattern of lines of different length corresponding in number and decade arrangement to the weight of the article when scanned transversely, means for scanning transversely across the chart to produce a count corresponding to the number of lines in each such decade position, means for determining when said chart has reached a stable position following a weighing operation including a series of lines on said chart, means mounted on a stationary support and cooperating with said lines upon said movable chart for preventing transversing movement of said scanning means until said chart has come to rest, a computing device, means for operating said computing device a number of times corresponding to the count of the number of lines scanned in each of said decade positions as the factor indicative of the weight, means for setting into said computing device as a second factor the price per pound, and means controlled by said computing device for producing an indication of the product of said unit price and the weight of the article representing the computed value thereof.

10. A computing scale mechanism for producing an indication of the computed value of an article being weighed comprising a chart movable in accordance with the weight of the article, means on said chart forming a pattern of lines of different length corresponding in number and decade arrangement to the weight of the article when scanned transversely, means for scanning transversely across the chart to produce a count corresponding to the number of lines in each such decade position, means for determining when said chart has reached a stable position following a weighing operation including a series of graduated lines on said chart, means mounted on a stationary support and cooperating with said lines upon said movable chart for preventing transverse movement of said scanning means until said chart has come to rest, and means controlled by said lines for displacing said chart following the reaching of a stable position thereof to maintain a predetermined uniform position of rest thereof with respect to said lines at a whole graduation position.

11. A computing scale mechanism for producing an indication of the computed value of an article being weighed comprising a chart movable in accordance with the weight of the article, said chart having a uniform pattern of lines thereon equidistantly spaced from each other in the direction of movement of the chart, said chart also having a second pattern of lines thereon of different lengths and arranged in groups corresponding to the decade divisions of the weight, means for projecting a light beam onto said first pattern of lines, light responsive means for sensing the movement of said chart and operable in response to stoppage thereof, means for projecting a second light beam onto said second pattern of lines, a single light sensitive means movable in translation across the chart and controlled by said second light beam for sensing the number of lines and producing a count thereof in each said decade position as indicative of the weight of the article, and means controlled by said first light responsive means for preventing the traversing movement of said sensing means until after said chart has reached a stable position.

12. A computing scale mechanism for producing an indication of the computed value of an article being weighed comprising a chart movable in accordance with the weight of the article, said chart having a uniform pattern of lines thereon equidistantly spaced from each other in the direction of movement of the chart, said chart also having a second pattern of lines thereon of different lengths and arranged in groups corresponding to the decade divisions of the weight, means for projecting a light beam onto said first pattern of lines, light responsive means for sensing the movement of said chart and operable in response to stoppage thereof, means for projecting a second light beam onto said second pattern of lines, means movable in translation across the chart and controlled by said second light beam for sensing the number of lines and producing a count thereof in each said decade position as indicative of the weight of the article, means controlled by said first light responsive means for preventing the [transversing] *traversing* movement of said sensing means until after said chart has reached a stable position, and means producing an indication of the weight count as showing the weight of the article.

13. A computing scale mechanism for producing an indication of the computed value of an article being weighed comprising a chart movable in accordance with the weight of the article, said chart having a uniform pattern of lines thereon equidistantly spaced from each other in the direction of movement of the chart, said chart also having a second pattern of lines thereon of different lengths and arranged in groups corresponding to the decade divisions of the weight, means for projecting a light beam onto said first pattern of lines, light responsive means for sensing the movement of said chart and operable in response to stoppage thereof, means for projecting a second light beam onto said second pattern of lines, means movable in translation across the chart and controlled by said second light beam for sensing the number of lines and producing a count thereof in each said decade *position* [positive] as indicative of the weight of the article, means controlled by said first light responsive means for preventing the traversing movement of said sensing means until after said chart has reached a stable position, a computing device having means for setting thereinto a unit price per pound, means for operating said computing device a number of times corresponding to the number of lines scanned in each of said decade positions, and means controlled by said computing device for producing an indication of the value of the article.

14. A computing scale mechanism for producing an indication of the computed value of an article being weighed comprising a chart movable in accordance with the weight of the article, said chart having a uniform pattern of lines thereon equidistantly spaced from each other in the direction of movement of the chart, said chart also having a second pattern of lines thereon of different lengths and arranged in groups corresponding to the decade divisions of the weight, means for projecting a light beam onto said first pattern of lines, light responsive means for sensing the movement of said chart and operable in response to stoppage thereof, means for projecting a second light beam onto said second pattern of lines, means movable in translation across the chart and controlled by said second light beam for sensing the number of lines in each said decade position as indicative of the weight of the article, means including said first light responsive means for preventing traversing movement of said sensing means until said chart has reached a stable position, means controlled by said first pattern of lines for sensing whether the position of rest of said chart is an intermediate position with respect to said second pattern of lines, and means controlled by said last mentioned means for displacing the chart whenever it stops at a said intermediate position to bring it to a uniform position with respect to said pattern of lines.

15. A computing scale comprising weighing mechanism, a chart movable in relation to the weight as determined by said mechanism, said chart having a pattern of lines thereon arranged in decade groups with the number of lines crossed in traversing the chart in each of said decade groups corresponding to the weight of the article, counting means for traversing the chart to count the number of lines in each said group, a computer having means for receiving a setting of the unit price, means controlled by said counting means for repeatedly actuating said computer a number of times corresponding to the count of each of said decade groups, and means controlled by said computer for producing an indication of the total value corresponding to the product of said unit price setting and the count of the number of lines in said several groups.

16. A computing scale comprising weighing mechanism, a chart movable in relation to the weight as determined by said mechanism, said chart having a pattern of lines thereon arranged in decade groups with the number of lines crossed in traversing the chart in each of said decade groups corresponding to the weight of the article, counting means for traversing the chart to count the number of lines in each said group, means for preventing the traverse of said counting means until said weighing mechanism and chart have come to rest, a computer having means for receiving a setting of the unit price, means controlled by said counting means for repeatedly actuating said computer a number of times corresponding to the count of each of said decade groups, and means controlled by said computer for producing an indication of the total value corresponding to the product of said unit price and the count of said decade groups.

17. A computing scale having weighing mechanism and a chart, said chart having a pattern of graduated lines thereon of different length and arranged in decade groups such that the number of lines in each group intercepted in traversing the chart corresponds to the weight of the article, said pattern of lines being offset by an amount corresponding to approximately half the minimum weight graduation, means for traversing the chart to count the lines in each of said groups, means for sensing the position of said chart with respect to stoppage thereof in an intermediate position between adjacent ones of said lines, and means operable in response to said sensing means for displacing said chart in the opposite direction with respect to said offset sufficiently to prevent stoppage thereof in said intermediate position and to bring said chart to the nearest whole graduation position.

18. A computing scale having weighing mechanism and a chart, said chart having a pattern of graduated lines thereon of different length and arranged in decade groups such that the number of lines in each group intercepted in traversing the chart corresponds to the weight of the article, means for traversing the chart to count the lines in each of said groups, means for sensing the position of said chart with respect to stoppage thereof in an intermediate position between adjacent ones of said lines, means operable in response to said sensing means for displacing said chart sufficiently to prevent stoppage thereof in said intermediate position and to bring said chart to a whole graduation position, and means for activating said traversing means only after the operation of said sensing means.

19. A computing scale having weighing mechanism and a chart, said chart having a pattern of graduated lines thereon of different length and arranged in decade groups such that the number of lines in each group intercepted in traversing the chart corresponds to the weight of the article, means for traversing the chart to count the lines in each of said groups, means for sensing the position of said chart with respect to stoppage thereof in an intermediate position between adjacent ones of said lines, means operable in response to said sensing means for displacing said chart sufficiently to prevent stoppage thereof in said intermediate position and to bring said chart to a whole graduation position, means for activating said traversing means only after the operation of said sensing means, and means controlled by said count for producing an indication of the weight and value of the article.

20. A computing scale mechanism for producing an indication of the computed value of an article being weighed comprising a chart including means thereon forming a pattern of impulse generating marks representing values of weight, a single means for reading said marks in sequence, means producing relative scanning movement between said chart and said reading means to generate impulses in sequence in a single output circuit in number and decade arrangement corresponding to digital values of weight, a computing device receiving said sequence of impulses as a weight factor, means for setting into said computing device a second factor representing price per pound, and means controlled by said computing device for producing an indication of the product of said unit price and the weight of the article representing the computed value thereof.

*21. In a load measuring device including a stationary system of elements, a load receiver, a movable system of elements supporting said load receiver and moving a distance which is a function of the applied load, an optical projecting system, a member bearing sections of alternately high and low levels of translucence in said projecting system, said member and said projecting system being movable relative to each other as a function of the movement of said movable system, a display screen arranged to receive projections of said sections to display said sections and thereby constitute visual indicia of applied load, a photocell arranged to receive light from said projecting system, whereby movement of said movable system with respect to said stationary system causes the photocell to receive alternate high and low intensity light, a pulse detector connected to said photocell, a photoelectric means generating an electrical signal characteristic of the position of said movable system with respect to said stationary system and means rendering said photoelectric means effective upon the termination of pulse detection in said detector.*

References Cited by the Examiner

The following references, cited by the Examiner, are of record in the patented file of this patent or the original patent.

UNITED STATES PATENTS

| | | | |
|---|---|---|---|
| Re. 22,947 | 12/47 | Clary | 235—60 |
| 1,299,786 | 4/19 | Schantz | 235—58 |
| 1,379,268 | 5/21 | Lake | 294—182 |
| 1,921,454 | 8/33 | Daly | 235—60.35 |
| 2,007,317 | 7/35 | Von Bohuszewicz | 177—13 |
| 2,376,234 | 5/45 | De Castro | 250—230 |
| 2,728,521 | 12/55 | Benson et al. | 235—60.4 |

OTHER REFERENCES

Marchant Model 8 SD–X catalog print, 1 sheet in paper No. 12 of parent application 300,445.

LEO SMILOW, *Primary Examiner.*